Dec. 31, 1940.   D. E. EVANS   2,226,811
AIRPLANE WING FLAP
Filed July 5, 1938   3 Sheets-Sheet 1

Inventor
Donald E. Evans
By
Charles L. Reynolds
Attorney

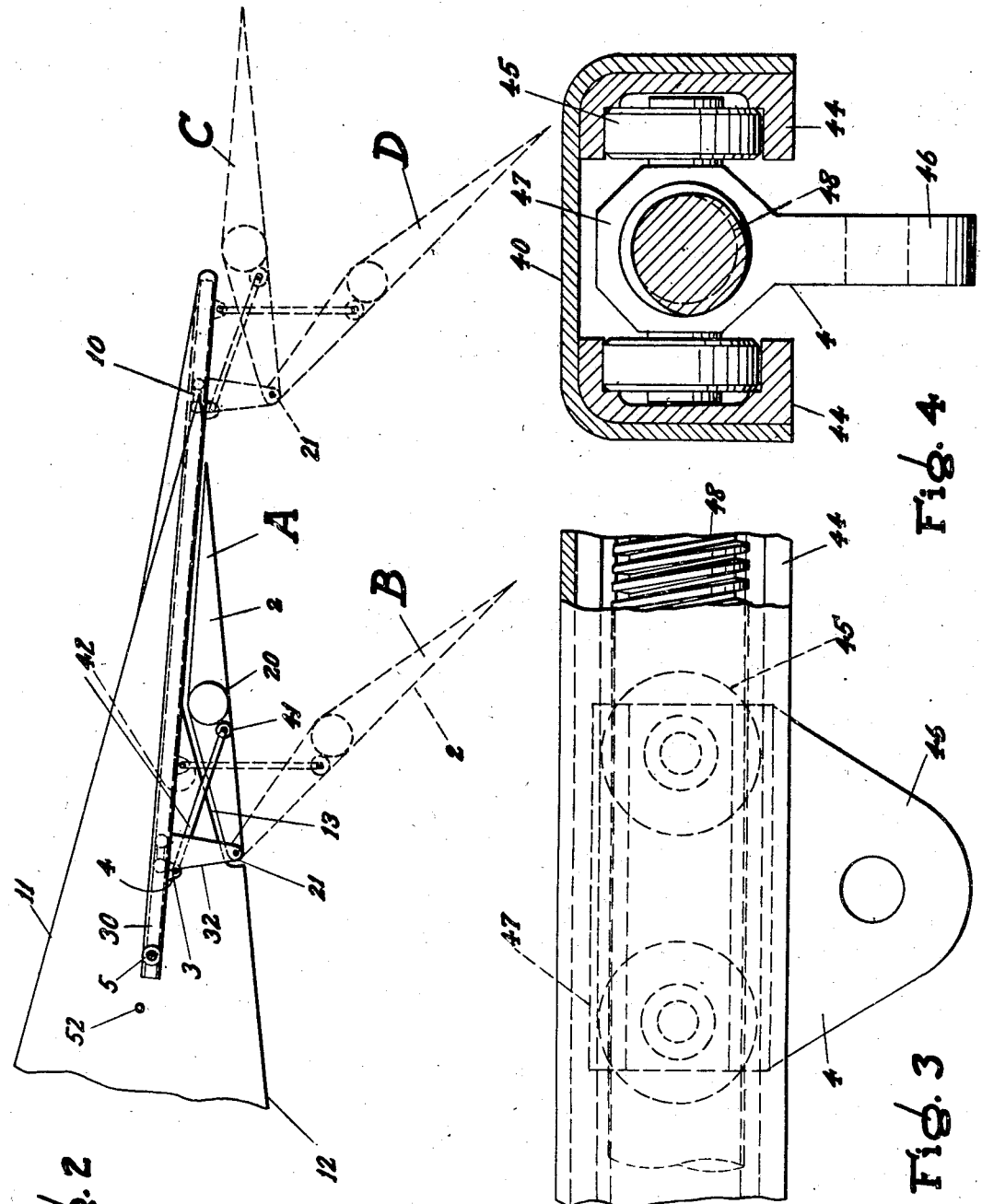

Dec. 31, 1940.  D. E. EVANS  2,226,811
AIRPLANE WING FLAP
Filed July 5, 1938  3 Sheets-Sheet 3
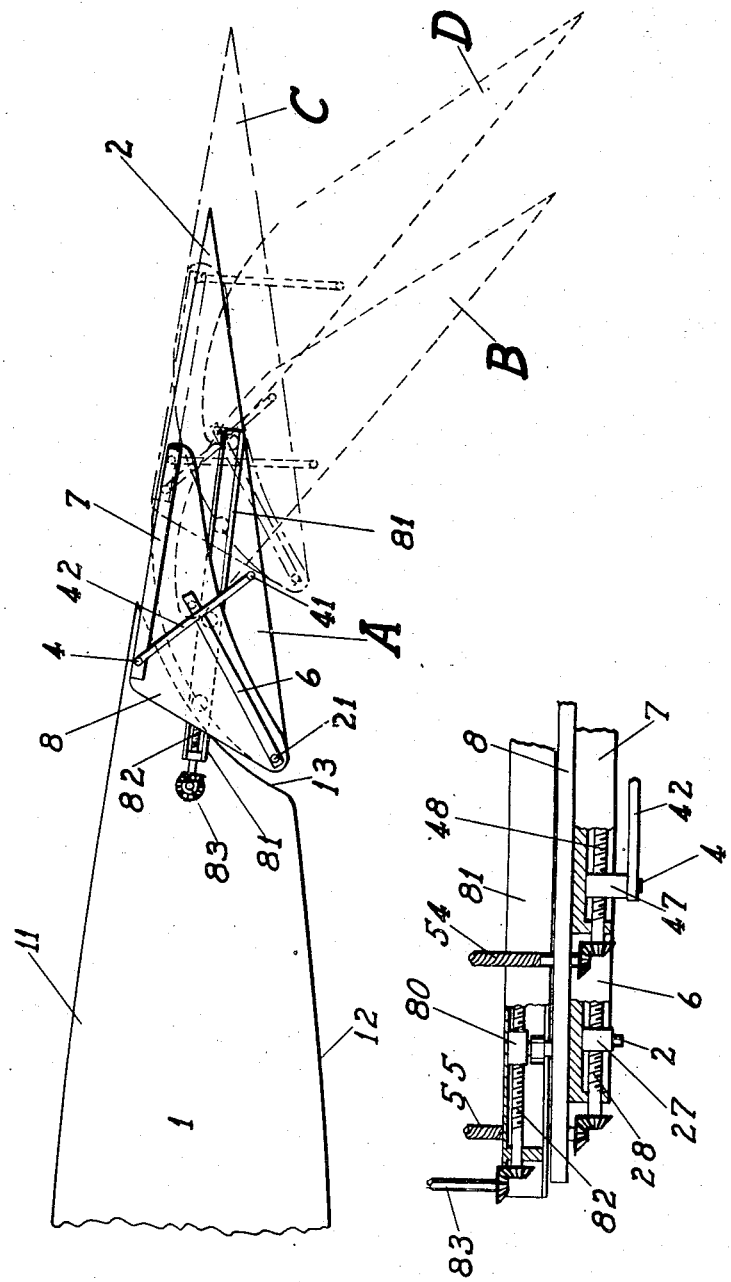
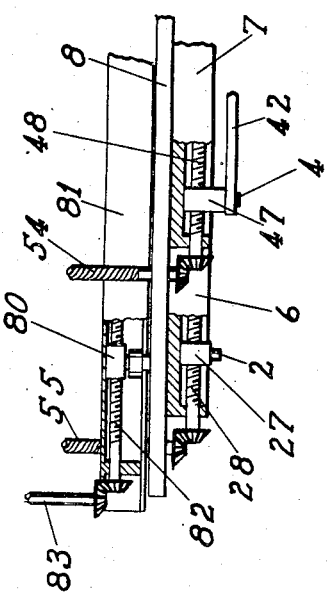
Inventor
Donald E. Evans
By Charles L. Reynolds
Attorney Patented Dec. 31, 1940

2,226,811

UNITED STATES PATENT OFFICE

2,226,811

AIRPLANE WING FLAP

Donald E. Evans, Seattle, Wash., assignor, by mesne assignments, to Boeing Aircraft Company, Seattle, Wash., a corporation of Washington Application July 5, 1938, Serial No. 217,401

11 Claims. (Cl. 244—42)

Wing flaps on airplanes are generally of one of two types—the split type or the Fowler type, or a modification of the latter. In the split type flap, a flap normally disposed immediately beneath the trailing edge of the wing, and frequently substantially flush with the wing's lower skin, may be swung downwardly on a pivot axis adjacent the flap's leading edge, so that in effect the trailing edge of the wing splits open or swings downwardly as a whole. The Fowler type flap, on the other hand, is so mounted, either by a pivot spaced below the wing and the leading edge of the flap, or by equivalent means, such as inclined links connecting the upper part of the flap to the wing, that the flap is moved bodily rearwardly, as its trailing edge is depressed, its leading edge being so curved as to keep its upper skin substantially continuous with the wing's upper skin.

Each type has advantages under certain conditions, but disadvantages under other conditions. Thus at take-off the desirable conditions involve the production of high lift with low drag, but high lift and high drag is needed at landing. The Fowler type flap produces high lift and less drag than the split type; therefore the Fowler type flap is the best for take-off, but since the relatively low drag is what makes it desirable at take-off, it does not produce sufficiently high drag to be a desirable type for landing, at least not as desirable as the split type flap, which produces high lift and high drag. The split type flap, therefore, is preferred for landing. Prior flaps, therefore, have been of one type or the other, depending upon whether attention was directed more to take-off conditions or to landing conditions, or they have been a compromise between the two, without attaining the full advantages of either.

It is an object of my invention to provide a flap which partakes to the full of the characteristics of either a split type flap or of a Fowler type flap, according to the conditions governing at the moment, or under control of the pilot.

More specifically, it is an object of this invention to provide a flap which may be operated as a split type flap purely, or which may be operated purely as a Fowler type flap, and which in any position of adjustment, when operating as one type of flap, may be adjusted in accordance with the adjustment of the other type of flap. To illustrate, in the preferred form of the invention the flap may be operated as a Fowler type flap, and at any point in its adjustment may be operated as a split type flap, or by proper arrangement or manipulation of controls the reverse may take place.

It is also an object of the invention to provide a flap having the characteristics indicated above, which will avoid to a large degree the attainment of conditions of stall in the flap itself under conditions requiring large displacement of the flap.

More specifically it is an object of the invention to provide a flap having the characteristics and capabilities indicated above, which may be so operated as to produce a slot between its leading edge and the trailing edge or under side of the wing, and which may be so mounted and arranged that the amount of the slot opening can be controlled and adjusted.

It is also an object of the invention to provide operating means for the flap which are simple, reliable, and light in weight, and which are well adapted to resist the forces and components which are applied to them in the various positions of use.

With the above objects in mind, and others as will appear hereafter, my invention comprises the novel parts and the novel combination and arrangement thereof, as shown in the accompanying drawings, described in this specification, and as will be more particularly defined by the claims which terminate the same.

In the accompanying drawings I have illustrated my invention in diagrammatic fashion, in a form and arrangement such as is at present preferred by me. It will be understood, however, that the drawings are largely diagrammatic in character, and that many details are omitted or parts are shown sketchily, the details and the practical construction whereof will be readily apparent to one skilled in this art.

Figure 2 is a section through the trailing edge of the wing, showing various positions of the flap.

Figure 3 is a side elevation of certain parts of the flap operating mechanism, and Figure 4 is a transverse section through the same.

Figure 5 is a view similar to Figure 2, showing a modified arrangement, and Figure 6 is a plan view of the immediate operating mechanism for the same.

Figure 1:
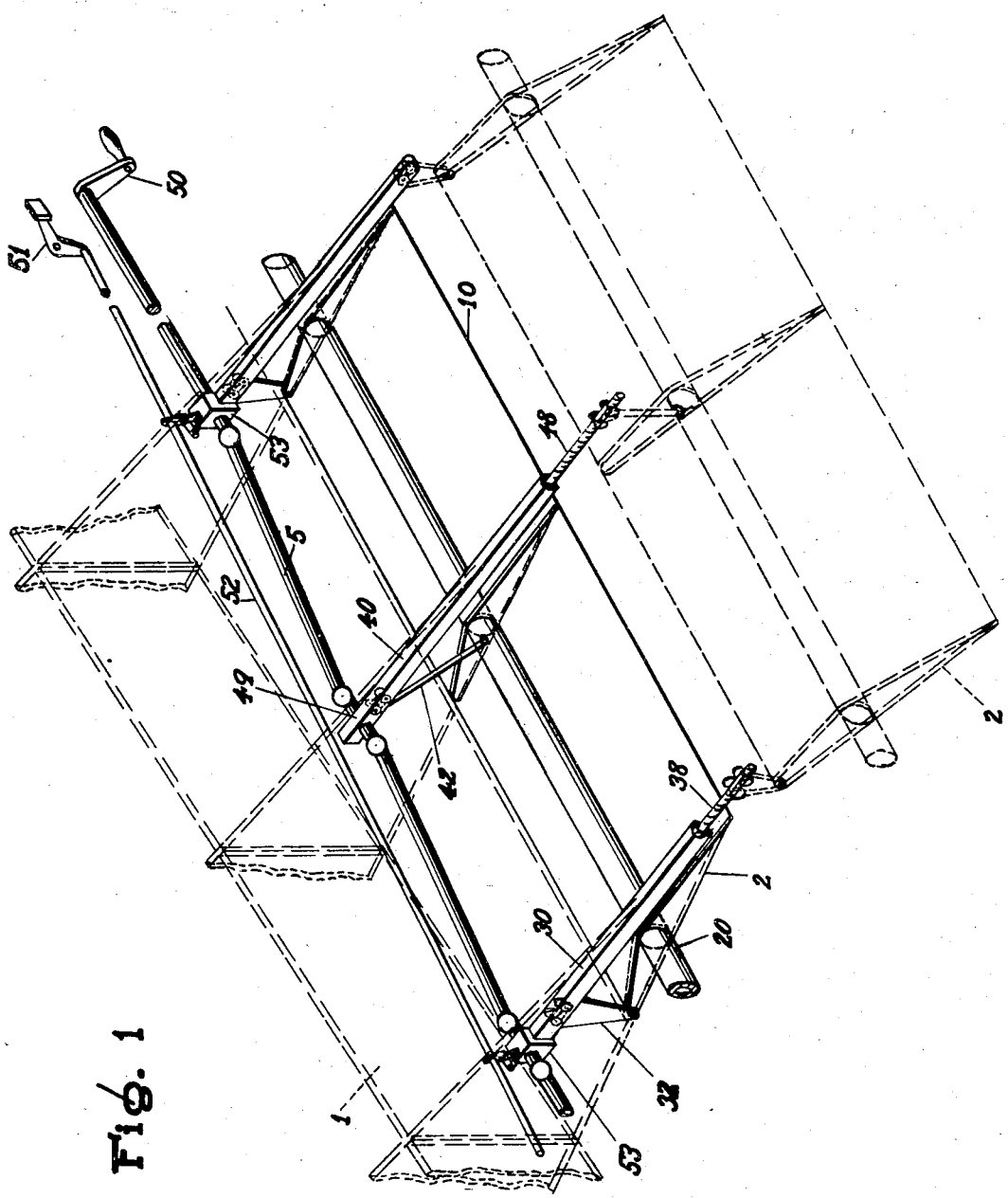
Figure 1 is a perspective view of the flap with its mounting and operating mechanism.

A wing 1, having the upper skin 11 and the lower skin 12, is typical of any airfoil with which such a flap is to be employed. The internal structure of the wing itself is of little or no consequence, and therefore has not been illustrated, or but sketchily. In the arrangement shown in Figures 1 and 2 the two skins meet at the trailing edge 10. Adjacent this trailing edge is a recess 13 into the lower skin 12. The recess may also interrupt the upper skin 11, that is to say, the recess 13 may terminate at its rear end either precisely at the trailing edge 10 or spaced somewhat forwardly thereof either in the under skin 12, as shown best in Figure 2, or in the upper skin 11, as shown in Figure 5. The span of the flap is whatever is necessary to produce the effect desired, considering the aerodynamic characteristics of the airplane as a whole.

The recess 13 is normally filled with the flap 2, the structure of which, other than the torque tube 20, is not illustrated. This flap, therefore, lies at the trailing edge of the wing, preferably beneath or flush with its lower skin 12, within the recess 13, although in the modified form the flap constitutes a greater or even the major portion of the trailing edge of the wing.

The form shown in Figures 1 to 4 will first be described. The flap is pivotally mounted at or near its leading edge, as indicated at 21, and this pivotal mounting is guided on the wing 1 for movement fore and aft. To that end a bracket 32 is formed rigidly with a carriage 3, and by suitable means this carriage is guided for movement through a predetermined fore and aft path within the wing. The carriage may be guided along a straight line track or tracks 30, which preferably, but not necessarily, lies between the upper surface 11 and the lower surface 12 of the wing. In the form shown the track 30 is inclined rearwardly and downwardly with respect to the lower skin 12, and the track extends through and past the trailing edge 10. Such details, however, are not of themselves an essential part of my invention, broadly considered.

The flap is also supported, and its position is controlled, by a link 42, pivotally connected at 41 to the flap at a point spaced lengthwise from (f. i. to the rear of) the pivotal connection at 21. From the pivotal point 41 the link 42 is inclined upwardly, but its direction of inclination, whether forwardly, rearwardly, or to the side, is largely immaterial. As shown it is inclined upwardly and forwardly, and its upper end is pivotally connected to a carriage 4, which is guided along a track 40, corresponding to the track 30. In the form shown the tracks 30 and 40 are parallel, and substantially coextensive in fore and aft direction. Parallelism is not essential, and indeed, a differential action may be attained if the tracks 30 and 40 are not parallel. The track 40, with its carriage 4, is shown in detail in Figures 3 and 4, and the track 30, with its carriage 3, is or may be substantially identical thereto, and therefore has not been shown in detail. Within the track 40, then, are guide rails 44, preferably of channel shape, within which are received rollers 45, two at each side of the carriage 4 and rigidly connected thereto, whereby the carriage is prevented from tilting relative to the track 40. To a depending bracket portion 46 the upper end of the link 42 is pivotally connected, and the upper portion 47 of the carriage is formed as a nut, within which is threaded a screw 48. By this or by equivalent means the carriage 4 is movable lengthwise of the track. The carriage 3 is similarly movable by a screw 38.

As will now be evident, any suitable means may be employed to move the carriages 3 and 4 in a fore and aft direction, the means shown being the screws 38 and 48, respectively, and any suitable means may be employed for rotating these screws in suitable fashion, and synchronously, when required. To accomplish this I may provide a shaft 5, rotatable from the cockpit by suitable means typified by the crank handle 50, this shaft being suitably journaled in the structure of the wing between its upper and lower skin, and being connected at 49 to rotate the screw 48 at all times. The same shaft 5 may also be connected to rotate the screws 38 coincidentally with the screws 48, or the screws 38 may be declutched from the shaft 5 so that rotation of the shaft 5 effects rotation of the screw 48 only. Thus clutch mechanism 53 is provided between the shaft 5 and each of the screws 38, this clutch being suitably controlled, as by the rod or cable 52 and the handle 51, adjacent the pilot's seat.

Whenever it is desired to operate the flap 2 as a pure split type flap, the clutches 53 are disengaged, or may be normally disengaged and are left so, whereupon, upon rotation of the shaft 5, only the screw 48 is rotated, effecting rearward movement of the carriage 4. The carriages 3 remain stationary. Rearward movement of the carriage 4 tends to bring the normally inclined link 42 to a position of less inclination both with respect to the wing and with respect to the flap 2, and the flap then moves from the normal retracted position A, in Figure 2, to the split position B. Reversal of the shaft 5 and screw 48 returns the carriage 4 to its normal position, and retracts the flap to the normal retracted position A. The operation just described has had the primary effect of increasing the camber of the wing, but without increase in its chord, and of increasing its drag.

If, on the other hand, it is desired to increase the chord of the wing, this may be done without increasing the camber, if such an operation is deemed desirable. This can be done by engaging the clutches 53 and then rotating the shaft 5, in this way effecting coincident rotation of the screws 38 and 48, so that the carriages 3 and 4 are moved rearwardly, jointly and synchronously. In that way all elements associated with the flap are moved at the same rate, and the flap is displaced bodily rearwardly, but without any depression of its trailing edge. It may be moved to an extreme position, shown as position C. In this position it will be noted that the flap's upper skin lies substantially in continuation of the upper skin 12 of the wing, notwithstanding its rearward displacement, by reason of the inclination of the tracks 30 and 40. It will be noted also that a slot has opened between the trailing edge 10 of the wing and the leading edge of the flap, the flap having been displaced bodily downwardly by the tracks' inclination, as well as rearwardly. This slot has a tendency to counteract any displacement of the wing's center of pressure rearwardly by reason of increase of its chord, and prevents the attainment of stall conditions upon depression of the flap.

From position C the flap's trailing edge may be depressed by throwing out the clutches 53, and continuing rotation of the shaft 5 and of the screw 48. As in the movement from position A to position B, the flap will pivot about its pivotal support at 21 from position C to position D. In the latter position it operates primarily as a Fowler type flap.

It is desired to point out here that downward swinging or depression of the flap may be accomplished at any point in its rearward displacement by merely throwing out the clutches 53 to prevent further rearward movement of the carriage 3 while yet accomplishing rearward movement of the carriage 4. A combination of such movements might simultaneously be obtained, by employment of suitable gearing to vary the relative rate of rotation of one screw 48, relative to the other, 38. Likewise in any angularly adjusted position of the flap it may be moved forwardly or rearwardly by throwing in the clutches 53, and then rotating the shaft 5 in the proper direction, for when the screws 38 and 48 are both clutched to the shaft 5, the flap is bodily displaced forwardly and rearwardly, but without any rotational effect. By proper control of the two types of movement—the bodily displacement and the rotational movement—any type of movement desired or necessary, or any position of the flap which may be desirable or necessary, may be obtained.

The modification shown in Figure 5 incorporates the general principles of the form heretofore described, in that the flap 2 is displaceable bodily rearwardly, and its trailing edge may be depressed in any rearward or forward position. The means of supporting it and for moving it are different, and illustrate how the principles of my invention may be incorporated in widely different mechanical forms.

The pivotal supports 21 and 41 of the flap are disposed substantially as shown in the form first described, and the pivot 21 is shiftable generally chordwise of the wing, but along an inclined line defined by the guide 6. The pivot point 41 is carried by a link 42, as before, the upper end of this link being guided for movement along an inclined guide 7. The guides 5 and 7 are not in this instance parallel, but are inclined relatively to each other, as may be seen in Figure 5.

Movement of the carriage 4 and of the pivot point 21 along their respective guides may be accomplished in any suitable manner, as by the nut 47 and screw 48 to move the pivot 41, driven in this instance by a flexible drive shaft 54, and in the case of the pivot point 21 through the nut 27 and screw 28, driven by the flexible shaft 55.

Whereas in the form first described, simultaneous rearward movement of the nuts along the parallel guides accomplished rearward displacement of the flap without change of its angle, in the present form simultaneous rearward movement of the two nuts accomplishes a tilting of the flap from the full line position A to a position B, so that the camber of the wing has been increased without appreciable, if any, increase in its chord. Bodily rearward displacement of the flap must therefore be accomplished in another way, and this may be done by supporting the guides 6 and 7 upon a common support or plate 8, to which are connected a nut or nuts 80 carried in guides 81 and threaded upon a screw 82 driven by the drive shaft 83. By such means the entire plate 8 may be displaced rearwardly, carrying with it the guides 6 and 7 and, of course, the flap 2 which is carried by these guides. Since the drive connections 54 and 55 are flexible shafts, the flap may, in any position between its forward and rearward limits of movement, be depressed. Bodily rearward movement of the flap advances it to a dot-dash position C, and in this position it may be depressed to a position D. It will be evident that by proper combination of the several movements a combination of movements of the flap bodily rearwardly and downwardly may be accomplished.

It will be understood that the forms and arrangements of the parts, as shown, are illustrative and are not intended to be restrictive in any sense, other than as required by the claims. Angularity of the tracks, relative or absolute, or their disposition relative to the wing, may be changed; the length and inclination of the link, the character of the means to effect movement of the upper end of the link or of the carriage 3—all these and like matters may be altered without departing from the spirit of my invention. Further, limiting positions and distances (as of the leading edge of the flap in its rearmost position), and the locus of the flap's trailing edge, and all such matters, are chosen in accordance with prevailing practice, according to the characteristics of the flap which predominate in its different positions; because these limiting and distinguishing factors are known in relation to each type of flap, per se, it is not believed to be necessary to specify them particularly in the combination flap, and they may be altered, as conditions may require, without departing from the spirit and principles of my invention.

What I claim as my invention is:

1. In combination with the wing of an airplane, a flap disposed at the wing's trailing edge, a support pivotally engaged with the flap's leading edge, whereby its trailing edge may swing downwardly, in all forwardly or rearwardly adjusted positions of the flap, a link pivotally engaged with the flap a substantial distance to the rear of its leading edge, and inclined upwardly from the flap, means to move the link's upper end towards and from a position wherein its upper end is substantially directly above its lower end, thereby, when the flap's leading edge support is stationary, to swing the flap downwardly as a split type flap, means to move the flap's leading edge support rearwardly and forwardly, and means to effect synchronization or asynchronization between the two moving means, whereby, by synchronization to effect bodily rearward or forward displacement of the flap, and by suitable asynchronization to effect a combined rearward displacement and downward swinging, as a Fowler type flap, or the flap's retraction.

2. In combination with the wing of an airplane, a flap disposed at the wing's trailing edge, a member supporting the flap from the wing, and pivotally connected to the flap adjacent the latter's leading edge, means guiding the member for movement of the pivotal point through a definite path fore and aft, a link pivotally engaged with the flap at a point to the rear of the first-mentioned pivotal point, and inclined thence upwardly, means on the wing guiding the upper end of the normally inclined link for movement relative thereto, towards and from a position of lesser inclination relative to the wing and flap, to depress the flap's trailing edge, and also in a direction generally parallel to the fore-and-aft path of the flap's leading edge pivotal support, and means alternatively operable to shift the link alone towards the position of lesser inclination, to alter the angularity of the flap relative to the wing or to shift the upper end of the link coincidentally with and generally parallel to the flap's leading edge pivotal support, to displace the flap bodily fore and aft, without change of its angularity.

3. In combination with the wing of an airplane, a flap disposed at the wing's trailing edge, a fore and aft guide track disposed between the upper and lower skins of the wing's trailing edge, and inclined rearwardly and downwardly, a carriage movable along said track and pivotally engaged with the flap's leading edge, a link pivotally engaged with the flap at a point to the rear of the first-mentioned pivotal point, and inclined thence upwardly and forwardly, a second guide track generally parallel to the first, a second carriage movable along the second track, to which the forward, upper end of the link is pivotally connected, and means operatively engaged with the two carriages to shift them along their guide tracks, and alternatively operable to shift the two carriages coincidentally and in the same direction, to effect bodily fore and aft displacement of the flap, without change in its angularity relative to the wing, or to shift the second carriage alone, to effect such change in the flap's angularity.

4. The combination of claim 3, the carriage shifting means including a single drive means operatively connected at all times to shift the second carriage, and clutch means interposed between said drive means and the first carriage.

5. The combination of claim 3, the carriage shifting means including a screw parallel to the guide track of each carriage, a cooperating nut on each screw and secured to the corresponding carriage, a single drive shaft extending along the wing and operatively connected at all times to rotate the screw which effects movement of the second carriage, and clutch means interposed between said drive shaft and that screw which effects movement of the first carriage.

6. In combination with the wing of an airplane, a flap disposed at the wing's trailing edge, a pivot support for the flap adjacent the flap's leading edge, a pivot support for the flap separate from and rearwardly of the first, independent guides for said respective pivot supports, separately mounted on the wing and guiding said pivot supports each for fore and aft movement, and means to effect differential movement of the pivot supports along their respective guides, in any forwardly or rearwardly adjusted position of the flap, to depress or elevate the flap's trailing edge.

7. In combination with the wing of an airplane, a flap disposed at the wing's trailing edge, a pivot support for the flap adjacent the flap's leading edge, a second pivot support for the flap separate from and rearward of the first, two guides carried by the wing, one for each of the pivot supports, disposed angularly relatively to each other, whereby by controlled movement of the respective pivot supports along their guides to depress or elevate the trailing edge of the flap.

8. In combination with the wing of an airplane, a flap disposed at the wing's trailing edge, a support pivotally engaged with the flap's leading edge, whereby its trailing edge may swing downwardly, in any forwardly or rearwardly adjusted position of the flap, a link pivotally engaged with the flap, to the rear of its leading edge, and inclined upwardly and forwardly from the flap, means guiding the leading edge support for fore and aft movement, means separate from said first means guiding the upper end of the link for fore and aft movement, operating means for moving said support along its guiding means, operating means independent of said first operating means for moving said link along its guiding means, and means to couple said two operating means together for joint movement of said support and upper link end, or to uncouple them for independent movement of said support and upper link end.

9. In combination with the wing of an airplane, a flap disposed at the wing's trailing edge, a flap-supporting member pivotally connected to the leading edge of the flap, a guide fixed to the wing and extending rearwardly from a location substantially directly above the leading edge of said flap in its forward position, means guided in said guide and carrying said flap-supporting member for fore and aft movement along it, a generally upright link having its lower end pivoted to said flap at a substantial distance rearwardly from the pivotal connection of said flap with said supporting member, a second guide disposed generally parallel to said first guide, means guiding the upper end of said link for fore and aft movement in said second guide, and operating means for effecting such fore and aft movement of the upper end of said link independently of movement of said flap-supporting member in its guide, thus to swing said flap about its pivotal connection with said flap-supporting member.

10. In combination with the wing of an airplane, a flap disposed at the wing's trailing edge, a pivot on the flap adjacent its leading edge, means supporting said pivot and guiding it for movement to dispose the flap in a position extended rearwardly behind the wing, a link pivotally connected to said flap by one end at a location rearwardly of said pivot, and means for supporting the upper end of said link from the aircraft structure rearwardly of the flap's leading edge in any adjusted position of the flap fore and aft, for swinging of the link with respect to the flap into a substantially upright position to swing the flap downwardly about its leading edge pivot.

11. In combination with the wing of an airplane, a flap disposed at the wing's trailing edge, a pivot upon the leading edge of said flap, means guiding said pivot for movement rearwardly to dispose the flap in a position extended rearwardly behind the wing, a link pivotally connected to said flap by one end at a location rearwardly of said pivot, and extending generally upward from the flap, a guide extending generally chordwise of the wing and disposed directly above the forward portion of said flap in its forward position, and means on said link guided by said guide for rearward movement of the upper end of said link with respect to said flap to dispose the link in a substantially upright position, thereby to swing said flap downward about said pivot.

DONALD E. EVANS.